United States Patent

Sugita

[11] Patent Number: 5,738,470
[45] Date of Patent: Apr. 14, 1998

[54] GUIDE DEVICE FOR CUTTING A GROOVE

[75] Inventor: Toyohisa Sugita, Tokyo, Japan

[73] Assignee: Kabushiki Kaisha Mirai, Tokyo, Japan

[21] Appl. No.: 766,823

[22] Filed: Dec. 13, 1996

[51] Int. Cl.[6] .................................................. B23C 1/20
[52] U.S. Cl. .................. 409/178; 144/136.95; 144/137; 144/371; 144/372; 409/182
[58] Field of Search ................................ 409/178, 181, 409/182; 144/371, 372, 135.2, 136.95, 136.1, 137, 144.1, 144.51, 145.1, 154.5

[56] References Cited

U.S. PATENT DOCUMENTS

| | | | |
|---|---|---|---|
| 3,782,431 | 1/1974 | Cox | 144/144.51 |
| 3,967,665 | 7/1976 | Lund | 144/371 |
| 4,735,531 | 4/1988 | Boerckel et al. | 409/182 |
| 4,770,216 | 9/1988 | Ruscak | 144/144.1 |
| 4,966,507 | 10/1990 | Hanks | 409/178 |
| 5,203,389 | 4/1993 | Goodwin | 409/182 |
| 5,240,052 | 8/1993 | Davison | 144/372 |
| 5,325,899 | 7/1994 | Kochling | 144/372 |
| 5,472,029 | 12/1995 | Ketch | 144/371 |
| 5,533,556 | 7/1996 | Whitney | 144/372 |

*Primary Examiner*—A. L. Pitts
*Assistant Examiner*—Christopher Kirkman
*Attorney, Agent, or Firm*—Sughrue, Mion, Zinn, Macpeak & Seas, PLLC

[57] ABSTRACT

In a guide device for cutting a groove of this invention, a rectilinear guide member (10) comprises a pair of guide members (11, 12), where the opening width ($W_1$, $W_2$) of an opening (26) defined between the guide members (11, 12) is set to be the same as the diameter of a rotary bit of a router (22). A dado (2) having a width that is the same as the thickness of a board to be used as a shelf is formed by operating the router (22) with a scrap piece of that board (3a) inserted between the guide members (11, 12) to get an accurately cut dado.

6 Claims, 7 Drawing Sheets

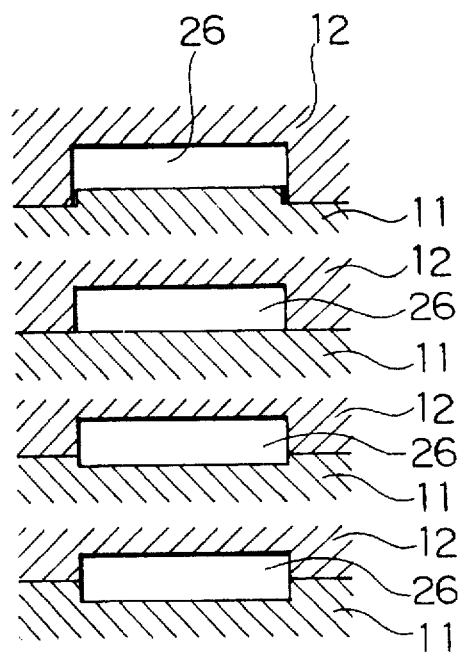
FIG. 13
FIG. 14
FIG. 15
FIG. 16
FIG. 17
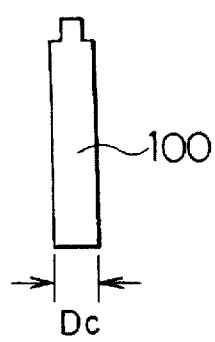
FIG. 18
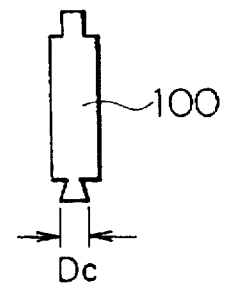

GUIDE DEVICE FOR CUTTING A GROOVE

BACKGROUND OF THE INVENTION

1. Field of the Invention

This invention relates to a guide device for cutting a groove or dado with a router, and more particularly to a novel improvement by which a groove having a width that is larger than the diameter of a rotary bit to be used and the same as the thickness of a board can be easily formed by defining, in a rectilinear guide member, a through hole having a width that is the same as the diameter of the rotary bit. By inserting a chip or scrap piece of the board to be fitted such as for shelving in the through hole after making a first cut, the device allows a groove having the same width as the board to be fitted therein to be easily formed by a second cut.

2. Description of the Related Art

Heretofore, the work of forming grooves or dado in side boards of a bookshelf, for example, and fitting shelf board to the grooves has been performed as shown in FIG. 1. First, a groove 2 is formed in a side board 1 by a rotary bit (not shown) of a router. Then, a shelf board 3 is brought into contact with the groove 2 and a position P corresponding to the thickness of the shelf board 3 is marked by a pencil. After that, the groove 2 is cut again by the router so that the groove width increases to the position P. The conventional method of forming a dado described above has had the following problems. To form a dado whose width is substantially the same as the thickness of a shelf board, the extra width not covered by the initial cut must be measured and marked in some fashion. Then the router must be run along the groove again to cut the dado to the desired width. Therefore, the work is complicated and it is difficult to cut a number of dados with an accurate width for the specific board to be used in each dado. To solve this problem, particularly when forming grooves that are larger than the rotary bit to be used, a variety of techniques using clamps and guide boards or fences have been proposed, but all suffer from being very complicated and inaccurate.

SUMMARY OF THE INVENTION

This invention has been made with a view to solve the problems stated above, and its object is to provide a guide device for cutting a dado and more particularly to a novel improvement by which a groove having a width that is larger than the diameter of a rotary bit to be used and the same as the thickness of a board can be easily formed by defining, in a rectilinear guide member, an opening having a width that is the same as the diameter of the rotary bit. By inserting a chip or scrap piece of the board to be fitted such as for shelving in the opening after making a first cut, the device allows a groove having the same width as the board to be fitted therein to be easily formed by a second cut.

According to this invention, a guide device for cutting a groove is provided which includes a rectilinear guide member for guiding a router provided with a rotary bit having a predetermined diameter, said rectilinear guide member comprising a pair of first and second guide members which are connected to be freely slidable in relation to each other and an opening formed between said guide members when they are in contact with each other having a width equal to a diameter of the rotary bit.

BRIEF DESCRIPTION OF THE DRAWINGS

FIG. 13 is a plan view of the opening in the present device.

FIG. 14 is a plan view of another configuration of the opening in the present device.

FIG. 15 is a plan view of another configuration of the opening in the present device.

FIG. 16 is a plan view of another configuration of the opening in the present device.

FIG. 17 is a side view of a rotary bit.

FIG. 18 is a side view of another rotary bit.

DESCRIPTION OF THE PREFERRED EMBODIMENTS

Figure 1:
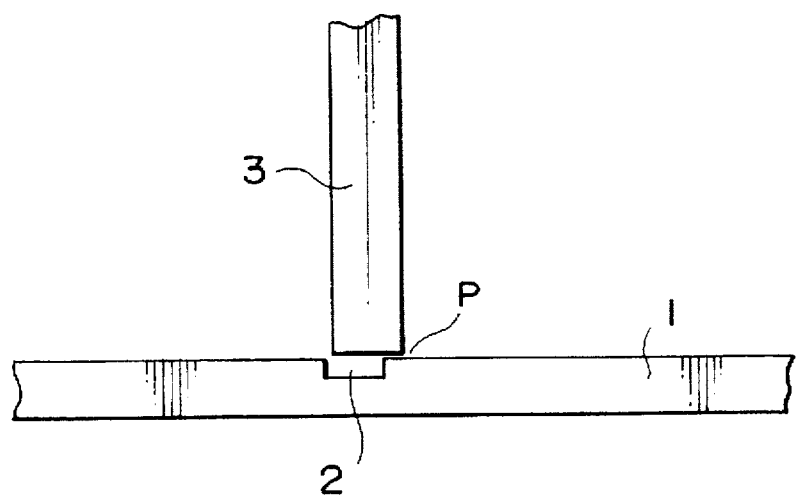
FIG. 1 is an explanatory view describing a prior method of cutting a dado.

Preferred embodiments of a guide device for cutting a dado according to this invention will be described hereunder with reference to the drawings. Note that the same components as in FIG. 1 showing the prior art are denoted by the same reference numerals.

Figure 4:
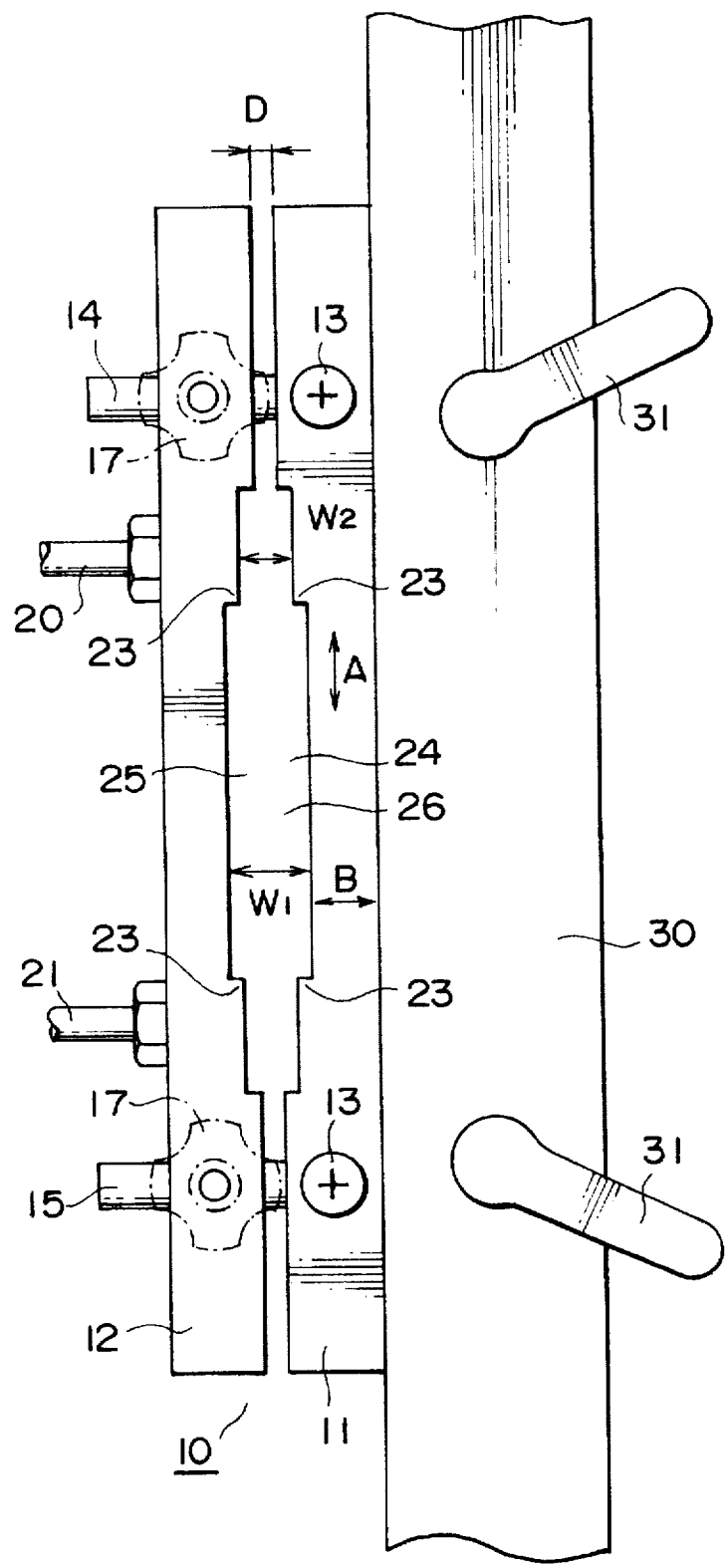
FIG. 4 is an enlarged plan view of a principal portion of the present device shown in FIG. 1.
Figure 5:
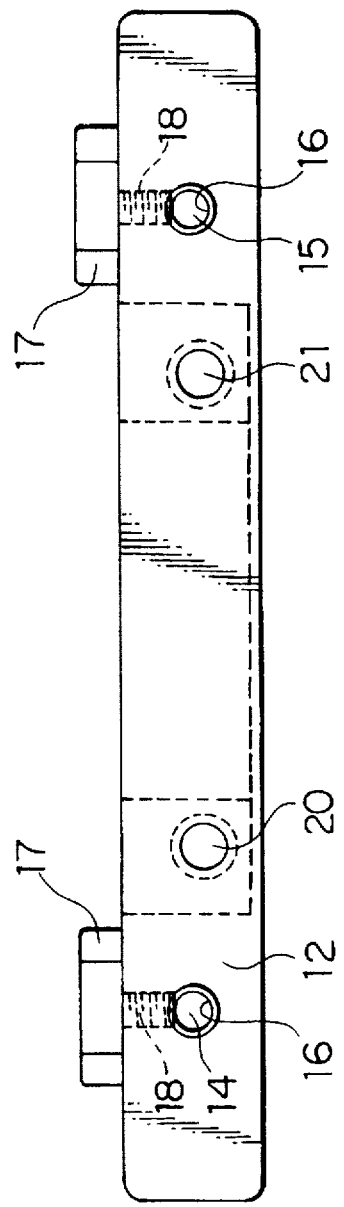
FIG. 5 is a left side view of FIG. 4.

In FIG. 4, 10 denotes a rectilinear guide member comprising a pair of first and second guide members 11, 12 each of which has an elongate shape. A pair of guide pins 14, 15 appropriately spaced from each other are fixed in the first guide member 11 by suitable fixtures such as screws or bolts 13, and a pair of guide holes 16 in the second guide member 12 are slidably fitted over each guide pin 14, 15 as shown in FIG. 5. In this way, the second guide member 12 is combined with the first guide member 11 through the guide pins 14, 15 such that the spacing D between both the guide members is freely adjustable.

At positions corresponding to the guide holes 16 of the second guide member 12, set bolts 17 are threadably fitted into threaded holes 18. By turning the set bolts 17 to press against the guide pins 14, 15, the guide members 11, 12 can be held in positions corresponding to a desired value of the spacing D. A pair of guide shafts 20, 21 are fixedly provided on a side face of the second guide member 12 in a spaced relation from each other, and a known router 22 (shown in FIG. 2) is slidably mounted on the guide shafts 20, 21 using guide or accessory apertures conventionally provided on routers.

Figure 2:
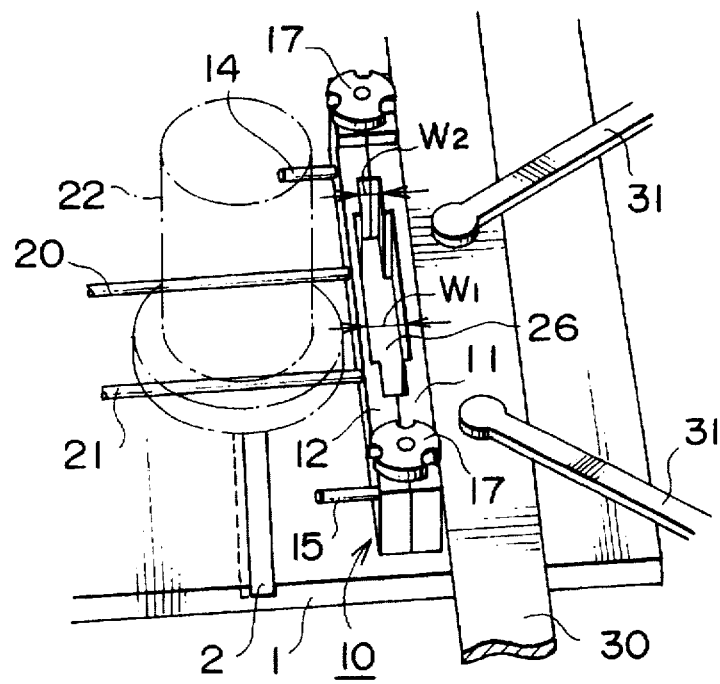
FIG. 2 is a perspective view for explaining a method of cutting a groove or dado using this invention.

Recesses 24, 25 for forming an opening including steps 23 are formed in inner side faces of the guide members 11, 12, respectively. When there is no spacing D between the guide members 11, 12, i.e., where the guide members 11, 12 are brought into contact with each other (as shown in FIG. 2), an opening 26 is defined in the rectilinear guide member 10 by the recesses 24, 25. The opening 26 has first and second opening widths $W_1$, $W_2$ ($W_1 > W_2$) which are separated by the steps 23 and are measured in the widthwise direction B perpendicular to the longitudinal direction A of the guide members 11, 12 (while the spacing D is present in the condition shown in FIG. 4, the opening widths $W_1$, $W_2$ are defined with the spacing D assumed to be zero). The opening widths $W_1$, $W_2$ are each selected to be the same as popular diameters (such as ¼ inch and ½ inch) of rotary or router bits (not shown) used in routers 22. However, this is only one example of the guide pins 14, 15 and the guide members 11, 12 may be linked to be freely movable in this relation to each other by any known means such as a toggle, pantograph or other similar linkage. Also, the opening 26 need not necessarily be a through hole, but may also be formed by bottomed recesses in the guide members 11 and 12 that do not run completely through the guide members themselves.

Figure 3:
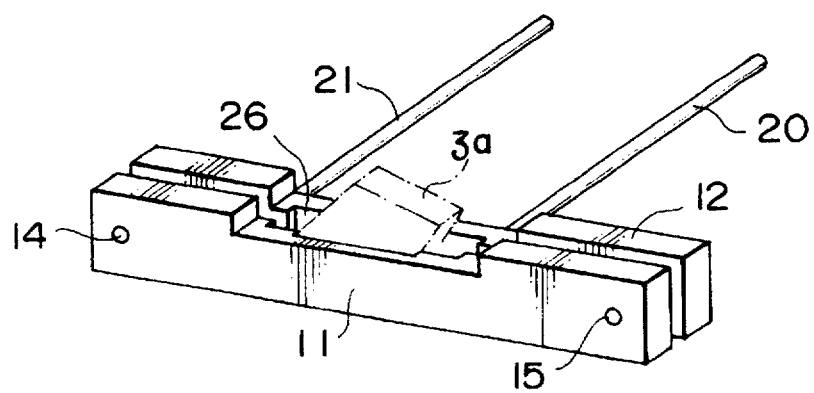
FIG. 3 is a perspective view of a principal portion of the present device part, the view showing a condition where a piece of scrap is inserted into the rectilinear guide member shown in FIG. 2.

The operation will be described below. As shown in FIG. 2, the router 22 is first mounted on the guide shafts 20, 21 as is well known, and the rectilinear guide member 10 is then placed parallel to and in contact with a guide board 30 commonly known as a fence, which is secured onto a board 1 by fixing members 31 such as C-clamps. The opening width $W_1$ at this time is the same as the diameter $D_c$ of the rotary bit 100 (FIG. 17) used in the router 22. Then, as shown in FIG. 2, a groove or dado 2 is formed by bringing the router 22 into contact with the rectilinear guide member 10 and moving it along the fence 30. With this operation, the groove 2 is formed to have a width that is the same as the diameter of the rotary bit 100. In order to increase the width of the dado 2 to that of the thickness of the particular board 3 to be used, the set bolts 17 are loosened and a scrap piece 3a of the board 3 is inserted into the opening 26, as shown in FIG. 3. The insertion of the scrap piece 3a makes the opening width $W_1$ equal to the thickness of the board 3. In other words, the router 22 mounted to the second guide member 12 of the rectilinear guide member 10 is moved to the left in FIG. 2 by the spacing D that is equal to the difference resulting from subtracting the opening width $W_1$ defined when the guide members 11, 12 are in contact with each other, from the thickness of the board 3. Thus, the relationship $W_1 + D =$ thickness of the board 3 holds. By cutting the dado 2 again, that is, with a second cut by the router 22 under these conditions, the dado 2 will now have a width that is the same as the thickness of the scrap piece 3a (that is the board 3) indicated by the dotted lines in FIG. 2. Consequently, the board 3 can be accurately fitted into the groove 2. While two types of rotary bits are available in this embodiment corresponding to the opening widths $W_1$, $W_2$, three or more different diameter rotary bits can also be used by designing the rectilinear guide member to have three or more opening widths.

Figure 6:
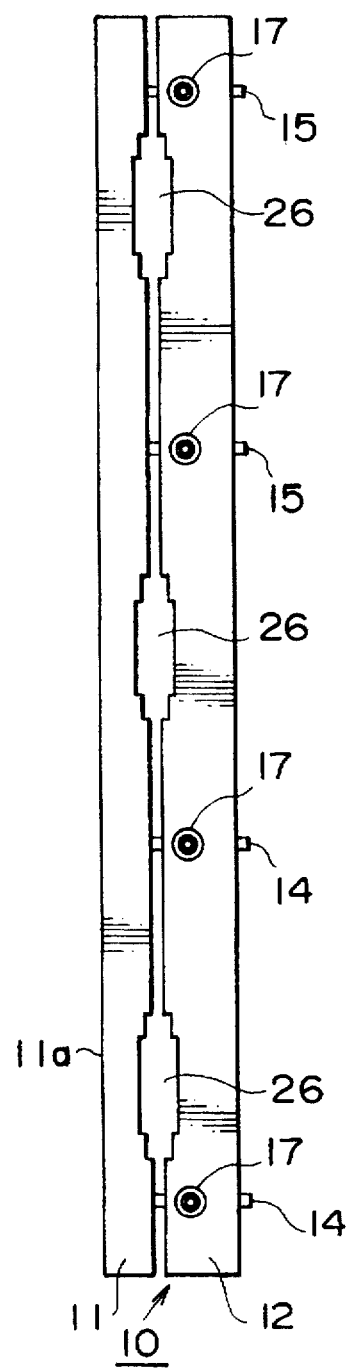
FIG. 6 is a plan view of another embodiment of the present device.

Next, FIG. 6 shows another embodiment of the guide device for cutting a dado. In this embodiment, the rectilinear guide member 10 itself is fixed onto the board 3 in place of the fence 30. The preliminary groove 2 is formed by moving the router 22 while the router 22 is kept in contact with a side face 11a of the first guide member 11 of the rectilinear guide member 10. While the guide members 11, 12 are used in the same manner as in the foregoing embodiment, the guide device for dado is made up of the rectilinear guide member 10 and the guide pins 14, 15.

Figure 7:
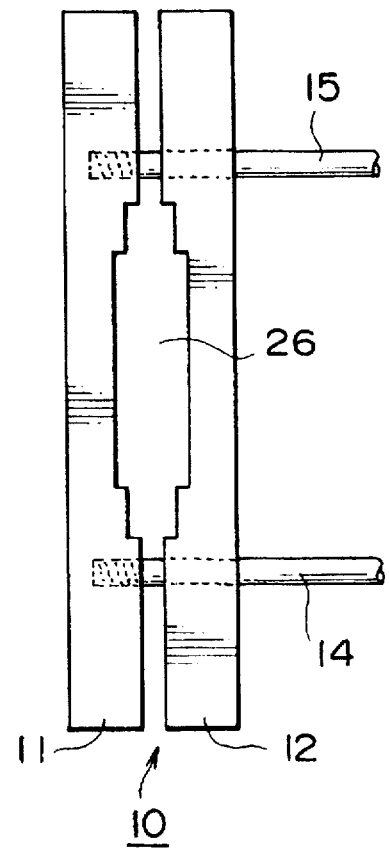
FIG. 7 is a plan view of still another embodiment of the present device.

Further, FIG. 7 shows still another embodiment wherein the guide pins 14, 15 are extended into an elongate shape and the router 22 is mounted directly on the extended guide pins 14, 15. The dado 2 is formed by sliding the router 22 and the rectilinear guide member 10 together in a manner similar to the embodiment shown in FIG. 2.

Figure 8:
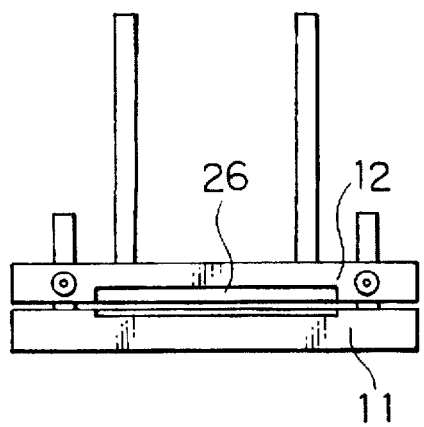
FIG. 8 is a plan view of another embodiment of the device in FIG. 3.
Figure 9:
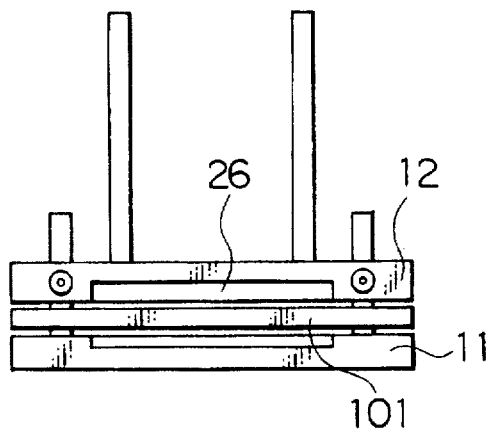
FIG. 9 is a plan view of another embodiment of the device in FIG. 3.
Figure 10:
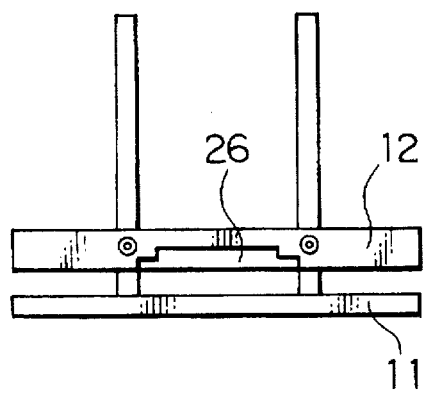
FIG. 10 is a plan view of another embodiment of the device in FIG. 3.
Figure 11:
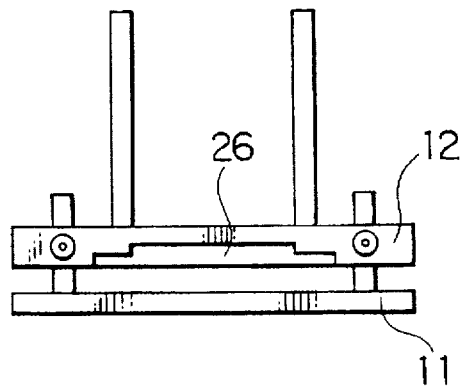
FIG. 11 is a plan view of another embodiment of the device in FIG. 3.
Figure 12:
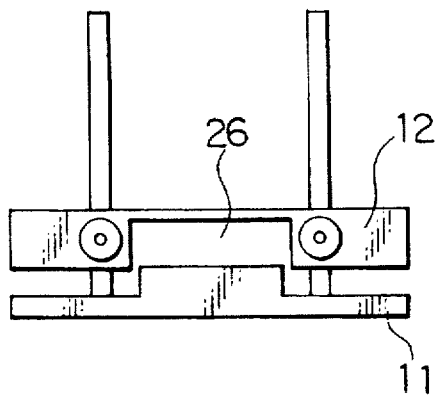
FIG. 12 is a plan view of another embodiment of the device in FIG. 3.

Further, it is also possible to form the opening 26 with different shapes in each of guide bodies 11 and 12 as shown in FIG. 8, to insert a board 101 between the guide bodies 11 and 12 as shown in FIG. 9, to make one of the guide bodies 11 or 12 flat as shown in FIGS. 10 and 11, and to form one of the guide bodies with a protruding portion as shown in FIG. 12. Accordingly, it is possible for the configuration of opening 26 to have any of the shapes shown in FIGS. 13 to 16 when the guide bodies are in contact with each other. Finally, the shape of the rotary bit 100 that may be used with the guide of the present invention is not limited to that shown in FIG. 17, but may also be in a shape as shown in FIG. 18 for example such as for cutting sliding dovetail grooves or dadoes. In this case, the diameter $D_c$ of the rotary bit is as large as the cutting portion of the bit itself, as seen in FIG. 18.

According to this invention, since the guide device for cutting a dado is constructed as described above, the following advantages can be obtained. By selecting a rotary bit having the same diameter as one of the widths of the opening formed in the rectilinear guide member for example, and making the preliminary cut, the distance by which the rotary bit is to be moved to achieve a desired dado width can then be accurately set just by inserting a scrap piece of the board to be used into the opening. It is thus possible to simply and accurately form a dado having a width that is the same as the thickness of the shelving to be used.

What is claimed is:

1. A guide device for cutting a groove which includes a rectilinear guide member (10) for guiding a router (22) provided with a rotary bit (100) having a predetermined diameter, wherein said rectilinear guide member (10) comprises a pair of first and second guide members (11, 12) which are connected to be freely slidable in relation to each other and an opening (26) formed between said guide members when they are in contact with each other having a width ($W_1$, $W_2$) equal to a diameter ($D_c$) of said rotary bit (100).

2. A guide device for cutting a groove according to claim 1, wherein said opening (26) is formed by a through hole that runs vertically through the rectilinear guide member.

3. A guide device for cutting a groove according to claim 1, wherein said opening (26) is formed by a bottomed recessed portion in said rectilinear guide member.

4. A guide device for cutting a groove according to claim 1, wherein a recessed portion (24,25) that forms said opening (26) is formed in either one or both of said guide members (11,12).

5. A guide device for cutting a groove according to claim 1, wherein each of said guide members (11,12) are connected through guide pins (14,15).

6. A guide device for cutting a groove according to claim 1, wherein there are a plurality of different opening widths ($W_1$, $W_2$).

* * * * *